(12) United States Patent
Yakabe et al.

(10) Patent No.: US 12,554,071 B2
(45) Date of Patent: Feb. 17, 2026

(54) OPTICAL CONNECTION STRUCTURE

(71) Applicants: SUMITOMO ELECTRIC INDUSTRIES, LTD., Osaka (JP); NIPPON TSUSHIN DENZAI CO., LTD., Komaki (JP)

(72) Inventors: Sho Yakabe, Osaka (JP); Motoyoshi Kimura, Komaki (JP)

(73) Assignees: SUMITOMO ELECTRIC INDUSTRIES, LTD., Osaka (JP); NIPPON TSUSHIN DENZAI CO., LTD., Komaki (JP)

( * ) Notice: Subject to any disclaimer, the term of this patent is extended or adjusted under 35 U.S.C. 154(b) by 407 days.

(21) Appl. No.: 18/024,431

(22) PCT Filed: Sep. 17, 2021

(86) PCT No.: PCT/JP2021/034403
§ 371 (c)(1),
(2) Date: Mar. 2, 2023

(87) PCT Pub. No.: WO2022/065254
PCT Pub. Date: Mar. 31, 2022

(65) Prior Publication Data
US 2023/0296850 A1 Sep. 21, 2023

(30) Foreign Application Priority Data
Sep. 25, 2020 (JP) ................. 2020-161211

(51) Int. Cl.
*G02B 6/38* (2006.01)
(52) U.S. Cl.
CPC ......... *G02B 6/3825* (2013.01); *G02B 6/3853* (2013.01)

(58) Field of Classification Search
USPC ............................................. 385/56
See application file for complete search history.

(56) References Cited

U.S. PATENT DOCUMENTS

| 5,940,561 A | 8/1999 | Dean, Jr. et al. |
| 9,448,367 B2* | 9/2016 | Ho ............. G02B 6/3825 |

(Continued)

FOREIGN PATENT DOCUMENTS

| JP | H11-344641 A | 12/1999 |
| JP | 2003-84171 A | 3/2003 |

(Continued)

OTHER PUBLICATIONS

Nov. 16, 2021 International Search Report issued in International Patent Application No. PCT/JP2021/034403.

*Primary Examiner* — Kaveh C Kianni
(74) *Attorney, Agent, or Firm* — Oliff PLC

(57) ABSTRACT

An optical connection structure including a first ferrule, a second ferrule, and an adapter is disclosed. The first ferrule includes a distal end portion where a first light incidence/emission unit is formed. The second ferrule includes a distal end portion where a second light incidence/emission unit is formed. Each first side surface of both the ferrules is provided with a recessed portion or a protruding portion, and each second side surface of both the ferrules is provided with a recessed portion or a protruding portion. The adapter has an inner surface provided with a protruding portion or a recessed portion, and a protruding portion or a recessed portion. Both the ferrules are fittable into the adapter such that the first and second light incidence/emission units are optically connected each other while the distal end portions of both the ferrules face each other at a predetermined distance separated from each other.

16 Claims, 11 Drawing Sheets

(56) References Cited

U.S. PATENT DOCUMENTS

| | | | |
|---|---|---|---|
| 11,181,696 B2* | 11/2021 | Ninomiya | G02B 6/3825 |
| 11,994,722 B2* | 5/2024 | Barthes | G02B 6/3897 |
| 12,061,364 B2* | 8/2024 | Cloud | G02B 6/3885 |
| 12,111,502 B2* | 10/2024 | Lu | G02B 6/3869 |
| 12,117,658 B2* | 10/2024 | Coenegracht | G02B 6/3849 |
| 2013/0272671 A1* | 10/2013 | Jones | G02B 6/3831 |
| | | | 385/139 |
| 2015/0253517 A1 | 9/2015 | Taira et al. | |
| 2017/0254964 A1 | 9/2017 | Yajima | |
| 2019/0004254 A1 | 1/2019 | Yoshino et al. | |
| 2019/0377139 A1 | 12/2019 | Chang et al. | |
| 2020/0103597 A1 | 4/2020 | Watanabe et al. | |
| 2020/0310041 A1* | 10/2020 | Chang | G02B 6/3878 |
| 2020/0371298 A1 | 11/2020 | Nakama et al. | |

FOREIGN PATENT DOCUMENTS

| | | |
|---|---|---|
| JP | 2004-086069 A | 3/2004 |
| JP | 2005-521094 A | 7/2005 |
| JP | 2015-187697 A | 10/2015 |
| JP | 2015203858 A * | 11/2015 |
| JP | 2017-161836 A | 9/2017 |
| JP | 2017-227815 A | 12/2017 |
| JP | 2019-90974 A | 6/2019 |
| WO | 03/081311 A1 | 10/2003 |
| WO | 2016/084113 A1 | 6/2016 |
| WO | 2018/221717 A1 | 12/2018 |

* cited by examiner

OPTICAL CONNECTION STRUCTURE

TECHNICAL FIELD

The present disclosure relates to an optical connection structure. The present application claims priority based on Japanese Patent Application No. 2020-161211 filed on Sep. 25, 2020, the entire contents of which are incorporated herein by reference.

BACKGROUND ART

Patent Literature 1 discloses a technique for aligning a plurality of optical fibers with each other using a guide pin. In this technique, one end portions of a pair of guide pins are respectively inserted into a pair of guide pin insertion holes provided in a distal end surface of a ferrule, and the other ends of the pair of guide pins are respectively inserted into a pair of guide pin insertion holes provided in a distal end surface of a ferrule as a connection counterpart. As a result, the plurality of optical fibers are aligned with each other (that is, alignment between the plurality of optical fibers and the plurality of optical fibers as a connection counterpart).

CITATION LIST

Patent Literature

Patent Literature 1: Japanese Unexamined Patent Publication No. 2019-90974

SUMMARY OF INVENTION

The present disclosure provides, as an aspect, an optical connection structure. The optical connection structure includes a first ferrule, a second ferrule, and an adapter capable of accommodating the first ferrule and the second ferrule therein. The first ferrule includes a distal end portion located at a distal end in a first direction that is a direction in which the first ferrule is inserted into or removed from the adapter and where a first light incidence/emission unit is formed, and a first side surface and a second side surface facing each other in a second direction intersecting the first direction. The second ferrule includes a distal end portion located at a distal end in the first direction and where a second light incidence/emission unit is formed, and a first side surface and a second side surface facing each other in the second direction. The first side surface of the first ferrule and the first side surface of the second ferrule are provided with a first recessed portion or a first protruding portion. The first recessed portion or the first protruding portion extends along the first direction. The second side surface of the first ferrule and the second side surface of the second ferrule are provided with a second recessed portion or a second protruding portion. The second recessed portion or the second protruding portion extends along the first direction. The adapter has an inner surface provided with a third protruding portion fittable with both the first recessed portions of the first ferrule and the second ferrule or a third recessed portion fittable with both the first protruding portions of the first ferrule and the second ferrule, and a fourth protruding portion fittable with both the second recessed portions of the first ferrule and the second ferrule or a fourth recessed portion fittable with both the second protruding portions of the first ferrule and the second ferrule. When both the first recessed portions or both the first protruding portions of the first ferrule and the second ferrule are fitted with the third protruding portion or the third recessed portion of the adapter and both the second recessed portions or both the second protruding portions of the first ferrule and the second ferrule are fitted with the fourth protruding portion or the fourth recessed portion of the adapter, the first ferrule and the second ferrule are fittable into the adapter such that the first light incidence/emission unit and the second light incidence/emission unit are optically connected each other while the distal end portion of the first ferrule and the distal end portion of the second ferrule face each other at a predetermined distance separated from each other in the adapter.

DESCRIPTION OF EMBODIMENT

Technical Problem

Figure 1:
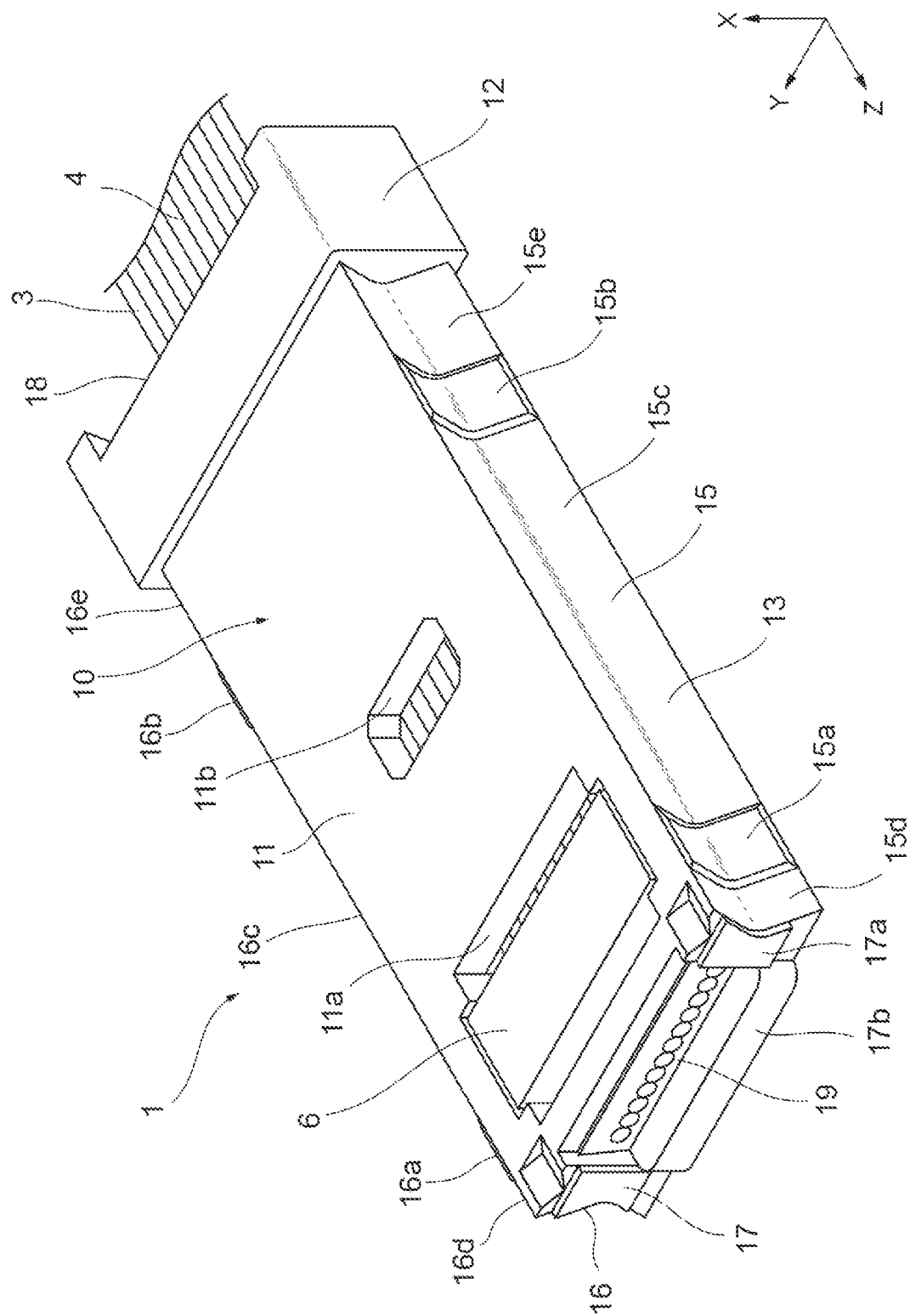
FIG. 1 is a perspective view illustrating an optical connector according to an embodiment.

As the technique disclosed in Patent Literature 1, in a case where a plurality of optical fibers are positioned with each other using guide pins and a ferrule provided with guide pin insertion holes, the following problem may occur. For example, in order to highly accurately position the plurality of optical fibers with each other, a guide pin having high dimensional accuracy is required so that the clearance with the guide pin insertion hole is as small as possible. Moreover, when cleaning the ferrule in which the guide pin is inserted into the guide pin insertion hole, foreign matter such as dust near the guide pin cannot be completely removed in some cases. In this case, the foreign matter may hinder the positioning accuracy between the plurality of optical fibers and decrease the positioning accuracy, and the connection loss may increase.

Advantageous Effects of Invention

With an optical connection structure according to the present disclosure, a plurality of optical fibers can be easily positioned with a simple configuration.

Description of Embodiment of Present Disclosure

First, contents of an embodiment of the present disclosure will be listed and described. An optical connection structure according to an embodiment of the present disclosure includes a first ferrule, a second ferrule, and an adapter capable of accommodating the first ferrule and the second ferrule therein. The first ferrule includes a distal end portion located at a distal end in a first direction that is a direction in which the first ferrule is inserted into or removed from the adapter and where a first light incidence/emission unit is formed, and a first side surface and a second side surface facing each other in a second direction intersecting the first direction. The second ferrule includes a distal end portion located at a distal end in the first direction and where a second light incidence/emission unit is formed, and a first side surface and a second side surface facing each other in the second direction. The first side surface of the first ferrule and the first side surface of the second ferrule are provided with a first recessed portion or a first protruding portion. The first recessed portion or the first protruding portion extends along the first direction. The second side surface of the first ferrule and the second side surface of the second ferrule are provided with a second recessed portion or a second protruding portion. The second recessed portion or the second protruding portion extends along the first direction. The adapter has an inner surface provided with a third protruding portion fittable with both the first recessed portions of the first ferrule and the second ferrule or a third recessed portion fittable with both the first protruding portions of the first ferrule and the second ferrule, and a fourth protruding portion fittable with both the second recessed portions of the first ferrule and the second ferrule or a fourth recessed portion fittable with both the second protruding portions of the first ferrule and the second ferrule. When both the first recessed portions or both the first protruding portions of the first ferrule and the second ferrule are fitted with the third protruding portion or the third recessed portion of the adapter and both the second recessed portions or both the second protruding portions of the first ferrule and the second ferrule are fitted with the fourth protruding portion or the fourth recessed portion of the adapter, the first ferrule and the second ferrule are fittable into the adapter such that the first light incidence/emission unit and the second light incidence/emission unit are optically connected each other while the distal end portion of the first ferrule and the distal end portion of the second ferrule face each other at a predetermined distance separated from each other in the adapter.

In this optical connection structure, both the ferrules as optical connection objects have the first side surface provided with the first recessed portion or the first protruding portion and the second side surface provided with the second recessed portion or the second protruding portion, and the adapter into which both the ferrules are inserted has the inner surface provided with the third protruding portion fittable with the first recessed portions or the third recessed portion fittable with the first protruding portions, and the fourth protruding portion fittable with the second recessed portions or the fourth recessed portion fittable with the second protruding portions. Then, when both the ferrules are inserted into the adapter, the first recessed portions are fitted with the third protruding portion or the first protruding portions are fitted with the third recessed portion, and the second recessed portions are fitted with the fourth protruding portion or the second protruding portions are fitted with the fourth recessed portion. Accordingly, the positions of both the ferrules (that is, the positions of a plurality of optical fibers held in each of both the ferrules) with respect to the adapter can be defined in a plane perpendicular to the first direction. That is, according to this optical connection structure, by using the adapter into which both the ferrules are inserted and fitted as a positioning member when the plurality of optical fibers are positioned, pluralities of optical fibers held by both the ferrules can be positioned without providing a guide pin insertion hole in both the ferrules. As a result, it is not necessary to use a guide pin having high dimensional accuracy for positioning the plurality of optical fibers with each other. Furthermore, it is possible to avoid a situation in which the positioning accuracy between the plurality of optical fibers decreases due to the use of the guide pin to which foreign matter adheres, so that a decrease in connection loss can be suppressed.

Moreover, in this optical connection structure, when the first recessed portion or the first protruding portion of each ferrule is fitted with the third protruding portion or the third recessed portion of the adapter and the second recessed portion or the second protruding portion of each ferrule is fitted with the fourth protruding portion or the fourth recessed portion of the adapter, the first ferrule and the second ferrule are fittable into the adapter such that the first light incidence/emission unit and the second light incidence/emission unit are optically connected each other while the distal end portion of the first ferrule and the distal end portion of the second ferrule face each other at the predetermined distance separated from each other in the adapter. In this case, since the optical connection structure has a non-contact structure between the distal end portions of both the ferrules, even in a case where foreign matter or the like adheres to the distal end portion of any of the ferrules, it is possible to reduce the influence on the distance between both the ferrules, the inclination of each ferrule, and the like. Furthermore, since end surface portions of both the ferrules are not in contact with each other in the optical connection structure, it is possible to prevent foreign matter adhering to the end surface portions from being fixed thereto by pressing or the like. As a result, it is possible to easily remove the foreign matter from the end surface portions by air or the like. Note that, according to this optical connection structure, a conventional fitting method using a guide pin is unnecessary, so that an expensive guide pin is unnecessary. Accordingly, it is possible to reduce the cost while maintaining the optical connection between the optical fibers held in the respective ferrules with high accuracy.

As an embodiment, when the first light incidence/emission unit and the second light incidence/emission unit are optically connected each other, the predetermined distance between the distal end portion of the first ferrule and the distal end portion of the second ferrule facing each other and separated from each other may be 0.05 mm or more and 2.0 mm or less. According to this embodiment, both the ferrules can be optically connected in a non-contact manner without lowering the optical coupling efficiency between the optical fibers held in the respective ferrules.

As an embodiment, at least a part of the first ferrule, the second ferrule, and the adapter may be provided with a positioning structure to position the distal end portion of the first ferrule and the distal end portion of the second ferrule so as to face each other at the predetermined distance separated from each other. By providing such a positioning structure, the first light incidence/emission unit and the second light incidence/emission unit can be more reliably optically connected each other while the distal end portion of the first ferrule and the distal end portion of the second ferrule face each other at the predetermined distance separated from each other in the adapter. In this embodiment, the first ferrule may further include a flange portion provided on a side opposite to the distal end portion in the first direction and having a width in the second direction larger than a width of the distal end portion. The flange portion may function as a part of the positioning structure to directly or indirectly position the first ferrule with respect to the adapter. Furthermore, the distance from an end of the flange portion of the first ferrule on a side of the distal end portion to the distal end portion may be 2 mm or more and 10 mm or less. Note that the second ferrule may include a similar flange portion.

As an embodiment, the optical connection structure according to any one of the above embodiments may further include a housing that accommodates the first ferrule. The housing may be configured such that movement of the housing along the first direction with respect to the adapter is restricted. Movement of the first ferrule along the first direction with respect to the housing may be restricted by the flange portion, whereby positioning of the first ferrule with respect to the adapter may be executed. According to this embodiment, the ferrule can be easily positioned with respect to the adapter by using the housing for operating the ferrule.

As an embodiment, at least one light incidence/emission unit of the first light incidence/emission unit and the second light incidence/emission unit may be a lens array arranged along the second direction. In this case, the light emitted from each ferrule can be easily made into collimated light, and the optical coupling efficiency between the optical fibers held by both the ferrules can be enhanced. In this embodiment, the lens array may be provided in a region recessed from a distal end surface of the distal end portion to the inside of the ferrule, and a distal end of the lens array may be located inside the ferrule with respect to the distal end surface. In this case, adhesion of foreign matter or the like to a lens surface of the lens array can be easily reduced. On the other hand, the lens array may have a shape protruding from the distal end surface of the distal end portion to the outside of the ferrule. In this case, the lens array protrudes, and not only the distal end but also the proximal end side of the lens array is formed to protrude to the surface. Accordingly, adhesion of foreign matter or the like to the lens array can be easily removed by a connector cleaner or the like. Note that both the first light incidence/emission unit and the second light incidence/emission unit may of course be the above lens array.

As an embodiment, at least one of the third protruding portion or the third recessed portion and the fourth protruding portion or the fourth recessed portion of the adapter may be configured to be elastically deformable in the second direction. According to this embodiment, the ferrule is easily inserted into the adapter, so that workability when the ferrule is inserted into the adapter is improved. Furthermore, when the ferrule is inserted into the adapter, in a case where the first recessed portion or the first protruding portion and the second recessed portion or the second protruding portion respectively abut on the third protruding portion or the third recessed portion and the fourth protruding portion or the fourth recessed portion, a force of at least one of the third protruding portion or the third recessed portion and the fourth protruding portion or the fourth recessed portion trying to return to the original position is applied to the ferrule. As a result, the ferrule is sandwiched and fixed by the third protruding portion or the third recessed portion and the fourth protruding portion or the fourth recessed portion, so that the positional displacement of the ferrule with respect to the adapter is suppressed. As a result, the plurality of optical fibers can be positioned with high accuracy.

Details of Embodiment of Present Disclosure

Hereinafter, an embodiment of the present disclosure will be described in detail with reference to the accompanying drawings. The present invention is not limited to these examples, but is indicated by the claims, and is intended to include any modifications within the meaning and scope equivalent to the claims. In the following description, the same reference numerals will be used for the same elements or elements having the same functions, and redundant description will be omitted.

Figure 2:
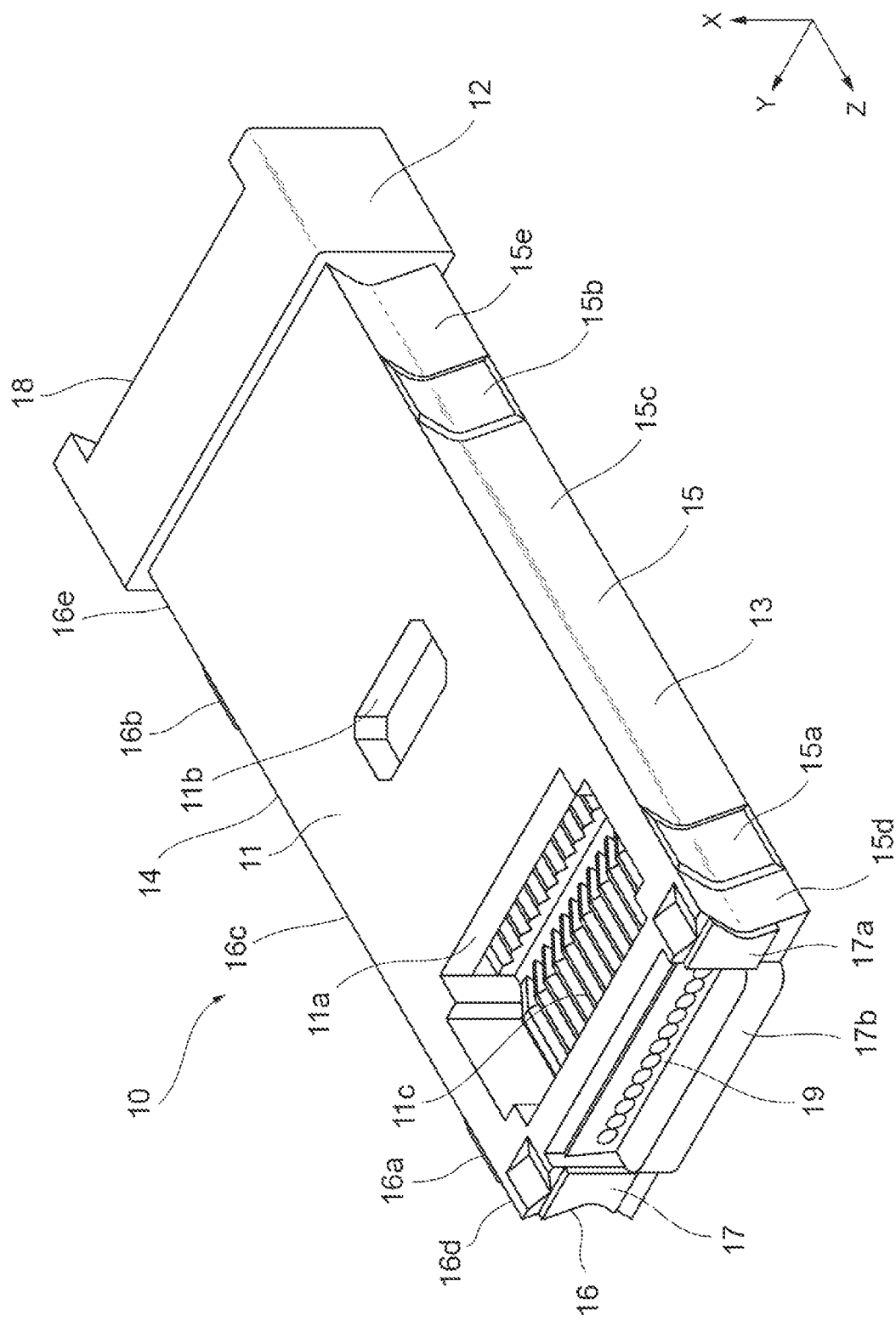
FIG. 2 is a perspective view illustrating a ferrule of the optical connector illustrated in FIG. 1.

First, configurations of an optical connector 1 and a ferrule 10 used in an optical connection structure according to the present embodiment will be described with reference to FIGS. 1 and 2. In the optical connection structure according to the present embodiment, optical connection is performed by causing respective light incidence/emission units (lens arrays and the like) of a pair of the optical connectors 1 to face each other by using an adapter 20 (see FIG. 3) described later. FIG. 1 is a perspective view illustrating the optical connector 1 according to an embodiment. FIG. 2 is a perspective view illustrating the ferrule 10, which is a main component of the optical connector 1 illustrated in FIG. 1. FIGS. 1 and 2 illustrate an XYZ orthogonal coordinate system for easy understanding. The same applies to other drawings. In the present embodiment, a longitudinal direction of the optical connector 1, which is a direction in which the optical connector 1 (ferrule 10) is inserted into and removed from the adapter 20, is defined as a Z direction (first direction), a lateral direction of the optical connector 1 is defined as a Y direction (second direction), and a height direction of the optical connector 1 is defined as an X direction (third direction).

The optical connector 1 includes, as illustrated in FIG. 1, an optical fiber ribbon 4 that houses a plurality of optical fibers 3, and the ferrule 10 attached to a distal end portion of the optical fiber ribbon 4. The respective optical fibers 3 of the optical fiber ribbon 4 extend along the Z direction and are arranged side by side along the Y direction intersecting (for example, orthogonal to) the Z direction. The optical fiber ribbon 4 may have a configuration in which the plurality of optical fibers 3 are arranged in the optical fiber ribbon 4 so as to overlap with each other in a plurality of stages. The plurality of optical fibers 3 are arranged in or inserted into a plurality of optical fiber grooves 11*c* or a plurality of optical fiber holding holes formed inside the ferrule 10 along the Z direction, and held.

The ferrule 10 is, as illustrated in FIGS. 1 and 2, a member for holding the respective distal end portions of the optical fibers 3, and optically coupling these optical fibers 3 to other optical fibers held in another optical connector (ferrule). The ferrule 10 includes a main body portion 11, a flange portion 12, side surfaces 13 and 14 (a first side surface and a second side surface), recessed portions 15 and 16 (a first recessed portion and a second recessed portion), a distal end portion 17, a rear end portion 18, and a lens array 19 (a first light incidence/emission unit or a second light incidence/emission unit). The ferrule 10 is made of a material such as polyphenylene sulfide (PPS), polyetherimide (PEI), polycarbonate (PC), polymethylmethacrylate (PMMA), polyethersulfone (PES), or cycloolefin polymer (COP), for example. The ferrule 10 may be entirely made of a light transmissive resin, or at least a region between the lens array 19 and the distal end portions of the optical fibers 3 may be made of a light transmissive resin. Another optical connector coupled to the optical connector 1 has a configuration similar to the optical connector 1.

The main body portion 11 is a portion that has a substantially rectangular parallelepiped appearance. The main body portion 11 has an upper surface provided with window portions 11a and 11b opened toward the inside of the ferrule, and a plurality of optical fiber grooves 11c for holding the plurality of optical fibers 3 are formed inside the window portion 11a. The plurality of optical fiber grooves 11c are, for example, V grooves or U grooves, and extend along the Z direction. Furthermore, an accommodation portion (internal space) extending from an opening at the rear end portion 18 toward the optical fiber grooves 11c is formed inside the main body portion 11, and the respective distal end portions of the optical fibers 3 inserted from the opening at the rear end portion 18 pass through the accommodation portion and are arranged in the optical fiber grooves 11c. The respective optical fibers 3 arranged in the optical fiber grooves 11c are optically coupled to respective lens portions of the lens array 19. The accommodation portion is formed to communicate with the window portions 11a and 11b, and after the optical fibers 3 are accommodated in the optical fiber grooves 11c, a lid portion 6 is put on the window portion 11a from above in the X direction, and the optical fibers 3 are pushed into the optical fiber grooves 11c. Thereafter, the optical fibers 3 are fixed to the plurality of optical fiber grooves 11c and the like with an adhesive agent or the like filled through the window portion 11a (a gap from the lid portion 6).

The flange portion 12 is a portion located at a rear end of the main body portion 11 in the Z direction, and the flange portion 12 is formed to be larger than the main body portion 11 in cross-sectional shape along an XY plane. The stepped portion of the flange portion 12 defines the position of the ferrule 10 in the Z direction with respect to the adapter into which the ferrule 10 is inserted, a housing that accommodates the ferrule 10, or the like. That is, the flange portion 12 functions as a part of a positioning structure for directly or indirectly positioning the ferrule 10 with respect to the adapter 20. In the ferrule 10, a portion other than the flange portion 12 may be used as a part of such a positioning structure.

Both the side surfaces 13 and 14 are side surfaces facing each other in the Y direction in the main body portion 11. The side surface 13 is provided with the recessed portion 15, and the side surface 14 is provided with the recessed portion 16. The recessed portions 15 and 16 are, for example, V grooves or U grooves extending in the Z direction, and function as guide grooves when the ferrule 10 is inserted into and removed from the adapter. The recessed portions 15 and 16 may not be formed in the flange portion 12, or may extend to the flange portion 12. In a case where the cross-sectional shape of the recessed portions 15 and 16 is a V groove, an opening angle of the V groove (that is, an angle formed by a pair of surfaces constituting the V groove) may be, for example, 45° or more and 150° or less, 60° or more and 100° or less, or 90° in a cross section perpendicular to the Z direction. Bottom portions of the V grooves constituting the recessed portions 15 and 16 may be, for example, rounded in a cross section perpendicular to the Z direction. Furthermore, the recessed portions 15 and 16 may have a semicircular shape in a cross section as long as the recessed portions 15 and 16 are configured to come into contact with protruding portions of the adapter 20 described later and be positioned.

The recessed portion 15 includes two positioning portions 15a and 15b, a stepped portion 15c located between the positioning portions 15a and 15b, a stepped portion 15d located outside the positioning portion 15a, and a stepped portion 15e located between the positioning portion 15b and the flange portion 12. The stepped portions 15c, 15d, and 15e are each recessed inward of the ferrule 10 with respect to each surface of the positioning portions 15a and 15b. In the ferrule 10, when the ferrule 10 is inserted into the adapter 20, the positioning portions 15a and 15b come into contact with protruding portion 24 or 25 of the adapter 20 (see FIG. 3), and the stepped portions 15c, 15d, and 15e do not come into contact with (or slightly touch) the protruding portion 24 or 25 of the adapter 20. That is, the positioning portions 15a and 15b define the position of one side of the ferrule 10 with respect to the adapter 20. As for the recessed amount of the stepped portions 15c, 15d, and 15e, for example, the difference between each surface of the positioning portions 15a and 15b and a bottom surface of each of the stepped portions 15c, 15d, and 15e is 0.01 mm or more.

The positioning portions 15a and 15b are separated from each other in a Z-axis direction, and the separation distance may be, for example, 3 mm or more and 10 mm or less. The separation distance here is the shortest separation distance between both the positioning portions, and for example, a distance between an end of the positioning portion 15a closer to the positioning portion 15b and an end of the positioning portion 15b closer to the positioning portion 15a. Furthermore, the positioning portion 15a is formed inward such that an end thereof is separated from a distal end surface 17a of the adjacent distal end portion 17 of the ferrule 10 in the Z-axis direction by at least 0.1 mm or more, and the positioning portion 15b is formed inward such that an end thereof is separated from the adjacent flange portion 12 of the ferrule 10 in the Z-axis direction by at least 0.1 mm or more. Furthermore, the positioning portions 15a and 15b may each have a width of 0.2 mm or more and 3 mm or less along the Z-axis direction. With such a certain width, when the ferrule 10 is inserted into the adapter 20, contact regions with the adapter 20 can be secured, and the positioning portions 15a and 15b can function as portions for more appropriately positioning the ferrule 10 (that is, the plurality of optical fibers 3 held therein) with respect to the adapter 20.

Similarly to the recessed portion 15, the recessed portion 16 includes two positioning portions 16a and 16b, a stepped portion 16c located between the positioning portions 16a and 16b, a stepped portion 16d located outside the positioning portion 16a, and a stepped portion 16e located between the positioning portion 16b and the flange portion 12. The recessed portion 16 has a shape line symmetrical to the recessed portion 15 about a center axis passing through the center of the ferrule 10 in the Y direction and extending in the Z-axis direction, the positioning portions 16a and 16b have a shape line symmetrical to the positioning portions 15a and 15b, the stepped portions 16c, 16d, and 16e have a shape line symmetrical (that is, a shape bilaterally symmetrical) to the stepped portions 15c, 15d, and 15e. Therefore, the positioning portions 16a and 16b are provided on the side surface 14 so as to be at the positions same as those of the positioning portions 15a and 15b on the side surface 13 in the Z direction. Furthermore, the stepped portions 16c, 16d, and 16e are each recessed inward of the ferrule 10 with respect to each surface of the positioning portions 16a and 16b. That is, the positioning portions 16a and 16b are formed to protrude slightly outward with respect to the stepped portions 16c, 16d, and 16e, and the positioning portions 16a and 16b define the position of the other side of the ferrule 10 with respect to the adapter 20. Other configurations of the positioning portions 16a and 16b and the stepped portions 16c, 16d, and 16e are similar to those of the positioning portions 15a and 15b and the stepped portions 15c, 15d, and 15e described above, and a detailed description thereof will be omitted. Note that the recessed portion 15 and the recessed portion 16 may not have shapes line symmetrical with each other, and the distance from the ferrule distal end to the positioning portion or the distance between the positioning portions may be different from each other.

In the ferrule 10 having such a side surface configuration, the distance between the bottom portions of the positioning portions 15a and 15b of the recessed portion 15 and the bottom portions of the positioning portions 16a and 16b of the recessed portion 16, which are facing each other along the Y direction, may be formed to be slightly greater than the distance between distal ends of the protruding portions 24 and 25 of the adapter 20. As a result, when the ferrule 10 is inserted into the adapter 20, the clearance becomes zero by the positioning portions 15a and 15b of the recessed portion 15 and the positioning portions 16a and 16b of the recessed portion 16, and the ferrule 10 is positioned with respect to the adapter 20 at a predetermined position.

The distal end portion 17 is a portion located at a distal end of the ferrule 10 in the Z direction, and provided with the lens array 19. The distal end portion 17 is provided with the lens array 19 in a region recessed rearward from the distal end surface 17a along the Z direction. The lens array 19 includes a plurality of lens portions aligned in the Y direction. The lens portions are each, for example, a collimating lens, and are optically coupled to the respective distal end portions of the optical fibers 3 arranged in the optical fiber grooves 11c from the inside of the ferrule. Therefore, in the ferrule 10, each optical fiber groove 11c holding the optical fiber 3 is formed to correspond to each lens portion of the lens array 19. Furthermore, the distal end portion 17 is provided with a protrusion portion 17b protruding forward from the distal end surface 17a below the lens array 19. Note that, instead of the lens array 19, through holes corresponding to the respective optical fibers 3 may be provided as a light incidence/emission unit so that the distal end portions of the optical fibers 3 can be directly inserted thereinto and exposed to the distal end portion 17 (or the distal end surface 17a). In this case, as the optical fibers 3, optical fibers having distal ends to which lenses are coupled in advance (GRIN lenses or rod lenses having an aspherical distal end) may be used, or optical fibers without these lenses or the like may be used as it is.

Figure 3:
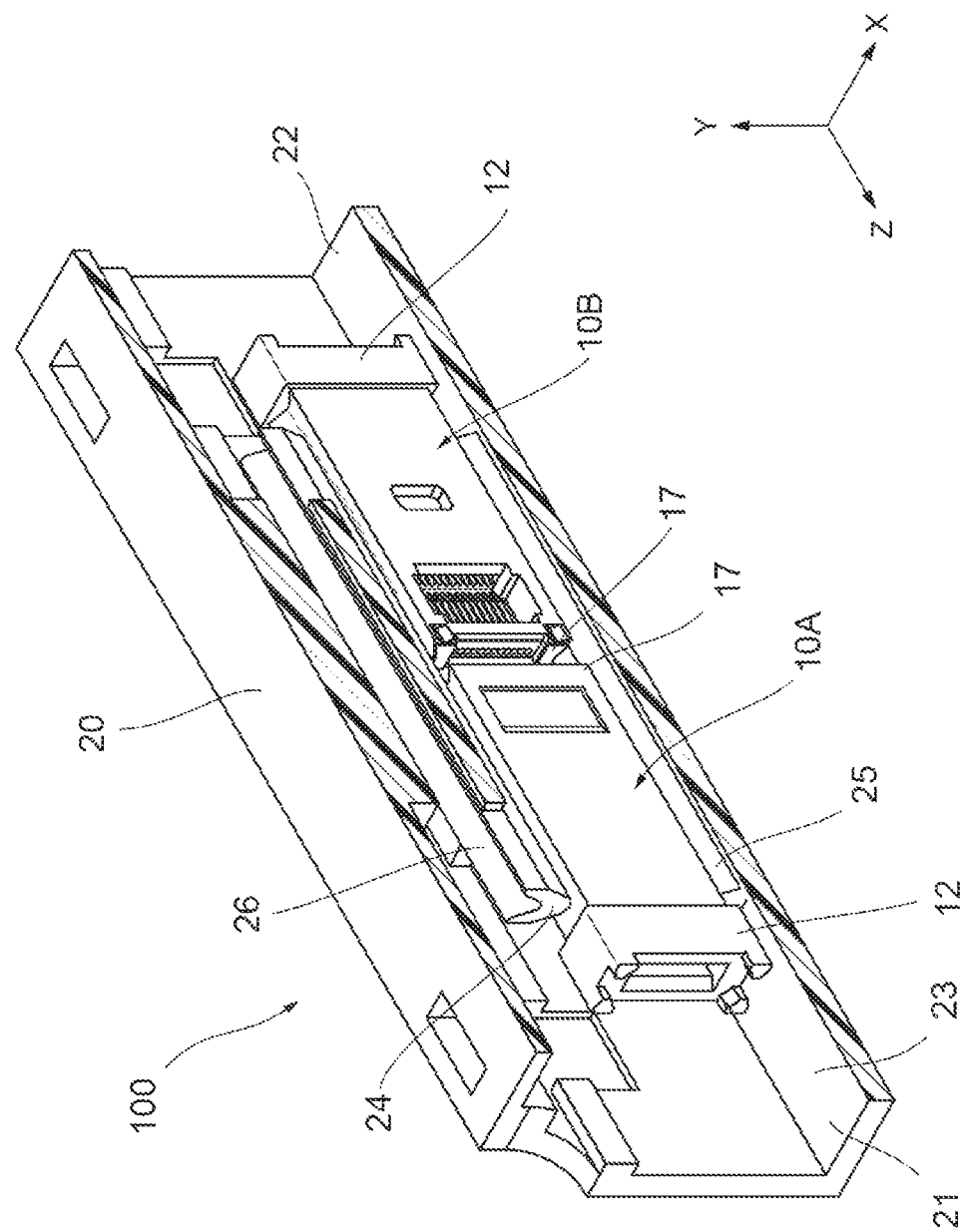
FIG. 3 is a perspective view illustrating an optical connection structure in which a pair of optical connectors (ferrules) are optically connected in an adapter.
Figure 4:
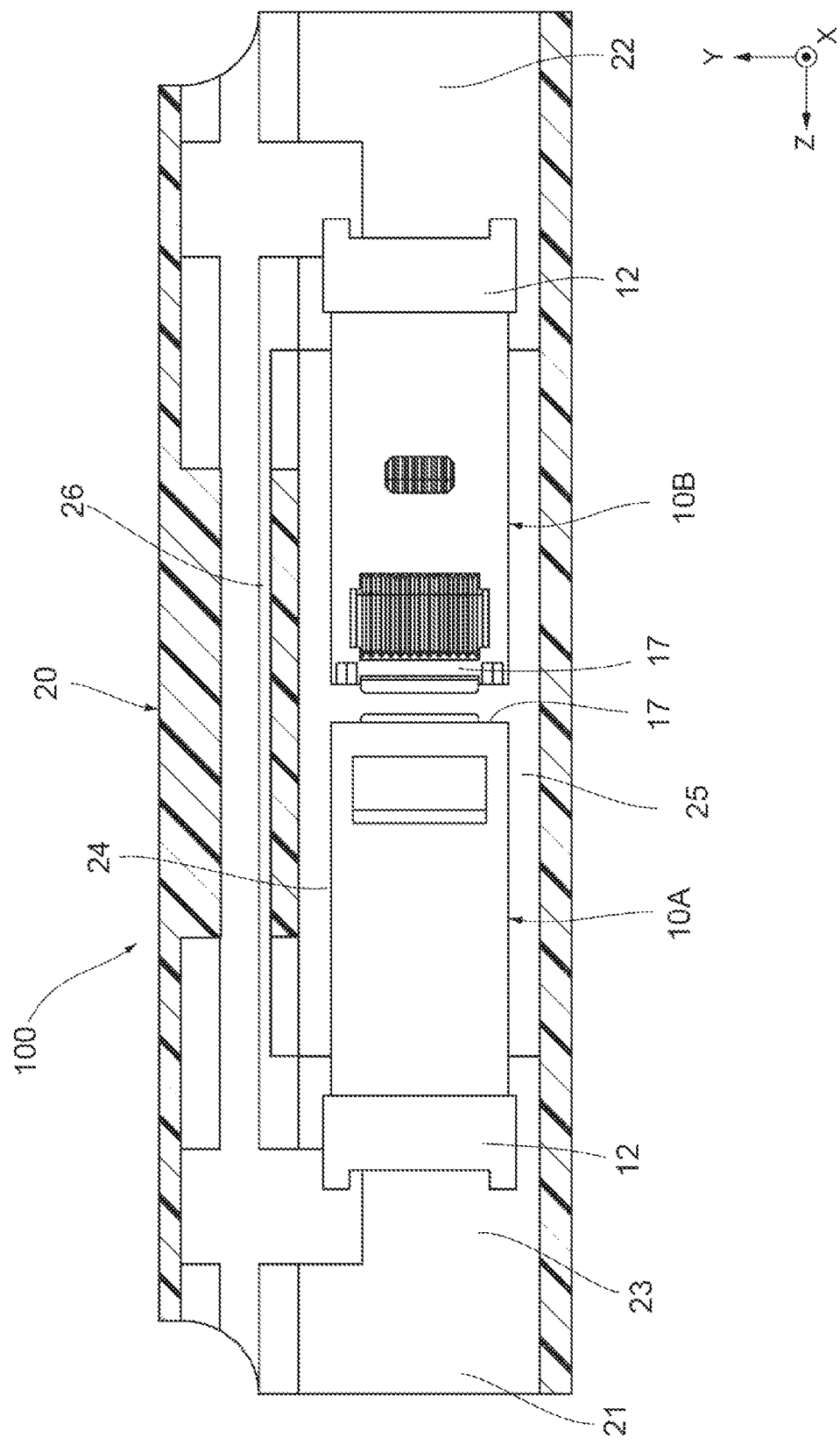
FIG. 4 is a view of the optical connection structure illustrated in FIG. 3 as viewed from a side surface side.
Figure 5:
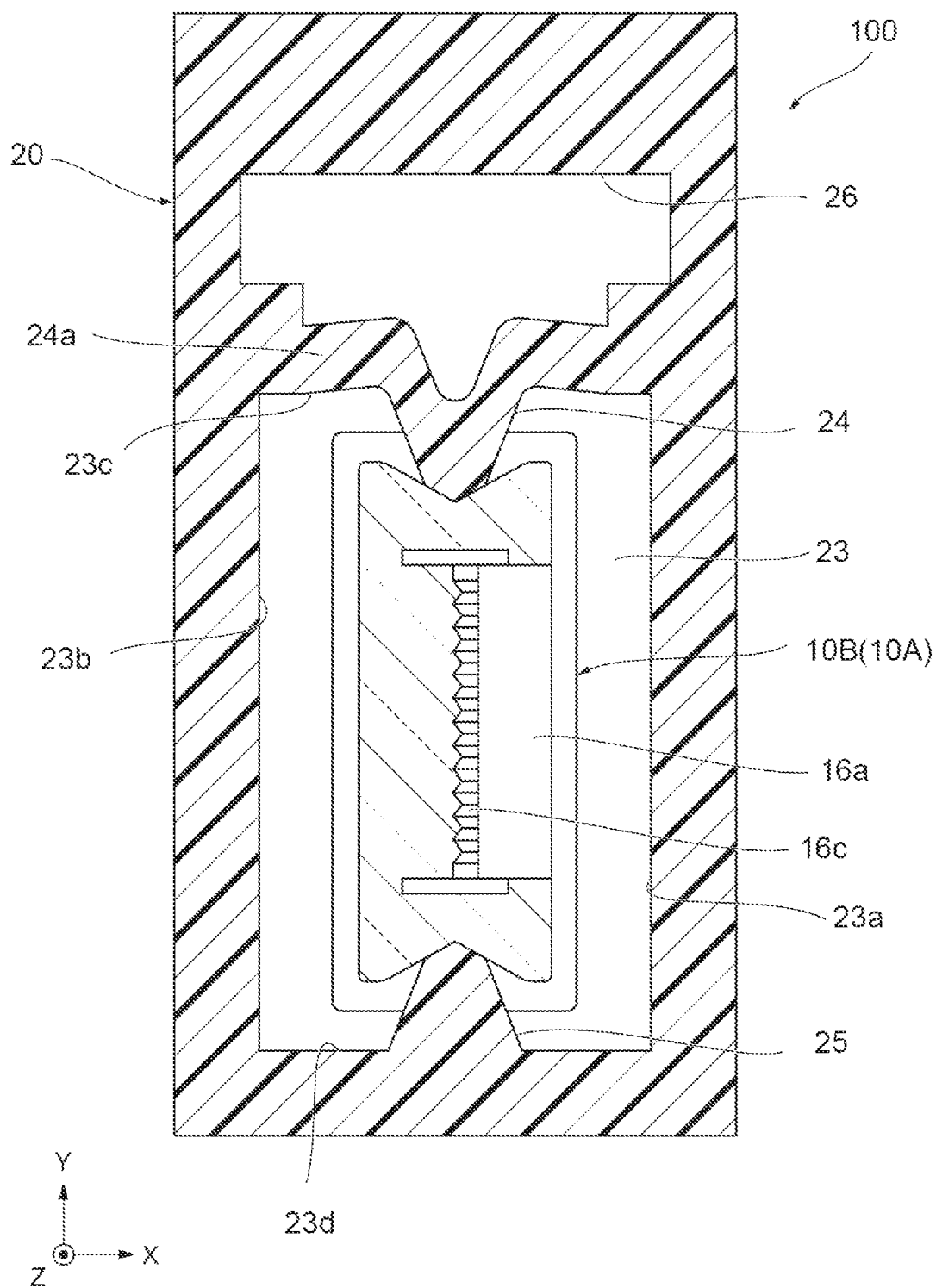
FIG. 5 is a cross-sectional view of the optical connection structure illustrated in FIG. 4.

Next, with reference to FIGS. 3, 4, and 5, an optical connection structure 100 for optically connecting the optical connectors 1 (ferrules 10) having the configuration described above to each other via the adapter 20 will be described. FIG. 3 is a perspective view illustrating an optical connection structure in which a pair of ferrules 10 (respectively illustrated as ferrules 10A and 10B, which have the same structure) are optically connected in the adapter 20. FIG. 4 is a view of the optical connection structure illustrated in FIG. 3 as viewed from a side surface side. FIG. 5 is a cross-sectional view of the optical connection structure illustrated in FIG. 4. In FIGS. 3 to 5, for ease of description, portions of the ferrules 10 (10A and 10B) of the optical connectors 1 are illustrated, and illustration of the optical fibers 3 and the like is omitted. Furthermore, in the optical connection structure 100, the ferrule 10A and the ferrule 10B are optically connected in a state in which the ferrules are inverted from each other in the X direction, but may be optically connected in a state in which the ferrules are in the same state without being inverted.

First, the configuration of the adapter 20 used in the optical connection structure 100 will be described. As illustrated in FIGS. 3 to 5, the adapter 20 is a member having a tubular shape for holding and optically connecting the pair of ferrules 10A and 10B so as to face each other inside thereof. Such an adapter 20 is made of an elastic material having elasticity such as polyetherimide (PEI), polybutylene terephthalate (PBT), polyphenylene sulfide (PPS), polycarbonate (PC), polymethylmethacrylate (PMMA), polyethersulfone (PES), or polyamide (PA), for example. In order to reduce the difference between the linear expansion coefficient of the material of the adapter 20 and the linear expansion coefficient of the material of the ferrules 10A and 10B, the same type of material as that of the ferrules 10A and 10B is preferably used as the material of the adapter 20. Furthermore, the material of the adapter 20 may contain a filler or an additive for improving slidability.

The adapter 20 has an accommodation portion 23 that opens at a first opening 21 and a second opening 22, and houses the ferrule 10A and the ferrule 10B in the accommodation portion 23. The accommodation portion 23 is a hole passing through the adapter 20 from the first opening 21 to the second opening 22, and as illustrated in FIG. 5, an internal space is defined by a pair of side surfaces 23a and 23b and a pair of side surfaces 23c and 23d. In the optical connection structure 100, for example, the ferrule 10A is inserted into the accommodation portion 23 from the first opening 21, and the ferrule 10B is inserted into the accommodation portion 23 from the second opening 22. The adapter 20 is fitted with the ferrules 10A and 10B such that the distal end portion 17 of the ferrule 10A and the distal end portion 17 of the ferrule 10B as a connection object face each other in the accommodation portion 23. Note that although details will be described later, inside the adapter 20, the distal end portion 17 of the ferrule 10A and the distal end portion 17 of the ferrule 10B as the connection counterpart are configured to be optically connected to each other at a predetermined distance separated from each other (see FIG. 6).

The adapter 20 is provided with the protruding portions 24 and 25 (a third protruding portion and a fourth protruding portion) facing each other in the Y direction on both side surfaces 23c and 23d of the accommodation portion 23. The protruding portions 24 and 25 protrude toward the inside of the adapter 20, and when the ferrules 10A and 10B are inserted into the adapter 20, the protruding portions 24 and 25 enter and come into contact with the recessed portions 15 and 16 (more specifically, the positioning portions 15a and 15b and the positioning portions 16a and 16b) of the respective ferrules 10A and 10B, and guide insertion of the ferrules 10A and 10B into the adapter 20 and its removal to the outside. The protruding portions 24 and 25 have a sufficient length in the Z direction so as to reliably guide and reliably hold the insertion of the pair of ferrules 10A and 10B into the accommodation portion 23. For example, the protruding portions 24 and 25 extend in the Z direction such that both the distance between both ends of the protruding portion 24 and the distance between both ends of the protruding portion 25 are longer than the distance between both the positioning portions 15b (or between both the positioning portions 16b) along the Z direction when the pair of ferrules 10A and 10B are arranged with distal ends thereof separated from each other by a predetermined distance.

The adapter 20 may further be provided with a void 26 outside the protruding portion 24 in the Y direction. By providing the void 26, the protruding portion 24 can be easily elastically moved outward in the Y direction. Therefore, even if the protruding portions 24 and 25 of the adapter 20 are formed to have a slightly narrow width so as to reliably come into contact with the recessed portions 15 and 16 of the ferrules 10A and 10B, the protruding portion 24 can be moved outward and adjusted when the adapter 20 is inserted. Note that, in the adapter 20, by adjusting the thickness or (for example, inclining) the extending angle with respect to the X direction of a support portion 24a supporting the protruding portion 24, the elastic movement toward the outside and the strength of the protruding portion 24 can be adjusted. Furthermore, a void such as the void 26 may be provided outside the protruding portion 25.

With respect to the adapter 20 having such a configuration, the ferrule 10A is inserted from the first opening 21, the ferrule 10B is inserted from the second opening 22, and the distal end portions 17 thereof are arranged to be separated from each other and face each other. As a result, the optical connection structure 100 is configured. In the optical connection structure 100, the ferrules 10A and 10B each include the recessed portions 15 and 16, and the adapter 20 includes the protruding portions 24 and 25. Accordingly, when the ferrules 10A and 10B are inserted into the adapter 20, the ferrules 10A and 10B (that is, the pluralities of optical fibers 3 of the optical connectors 1) can be positioned by restricting the positions of the ferrules 10A and 10B with respect to the adapter 20 in the X direction and the Y direction and each rotation about each axis of the XYZ axes, even if guide pins are not provided in the ferrules. As a result, it is not necessary to use a guide pin having high dimensional accuracy for positioning the plurality of optical fibers 3 with each other. Furthermore, it is possible to avoid a situation in which the positioning accuracy between the plurality of optical fibers 3 decreases due to the use of the guide pin to which foreign matter adheres, so that a decrease in connection loss can be suppressed.

Figure 6:
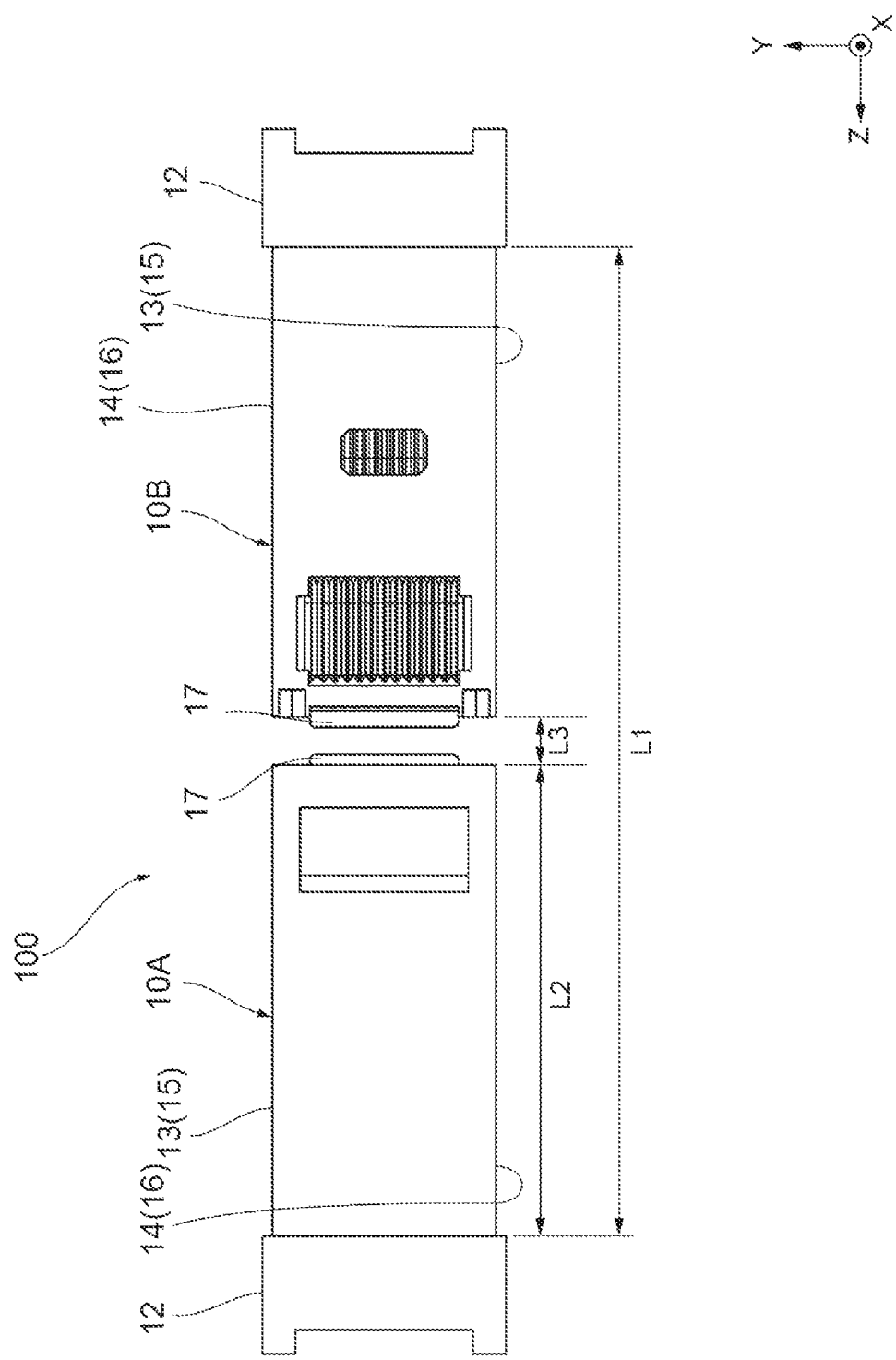
FIG. 6 is a plan view illustrating a state in which the pair of optical connectors (ferrules) are separated from each other by a predetermined distance at the time of being optically connected in the adapter.

Next, an optical connection state in which the pair of ferrules 10A and 10B (optical connectors 1) face each other at a predetermined distance separated from each other in the optical connection structure 100 will be described in more detail with reference to FIG. 6. FIG. 6 is a plan view illustrating a state in which the pair of ferrules 10A and 10B are separated and face each other at the time of being optically connected in the adapter 20. Note that, in FIG. 6, for ease of description, illustration of the adapter 20, the optical fibers 3, and the like is omitted.

In the optical connection structure 100, as described above, the pair of ferrules 10A and 10B are positioned not by the positioning using a guide pin but by a method in which the recessed portions 15 and 16 provided in the side surfaces are caused to be fitted with the protruding portions 24 and 25 of the adapter 20. That is, when the recessed portion 15 or 16 of each of the ferrules 10A and 10B is fitted with the protruding portion 24 of the adapter 20, and the recessed portion 16 or 15 of each of the ferrules 10A and 10B is fitted with the protruding portion 25 of the adapter 20, the ferrules 10A and 10B are fitted into the adapter 20 such that the lens array 19 of the ferrule 10A and the lens array 19 of the ferrule 10B are optically connected each other while the distal end portion 17 of the ferrule 10A and the distal end portion 17 of the ferrule 10B face each other at a predetermined distance separated from each other in the adapter 20. Note that, in the optical connection structure 100, as positioning of the ferrules 10A and 10B, for example, as described above, the stepped portion of the flange portion 12 of each ferrule is brought into contact with the inner surface of the adapter 20 or the like, and the ferrules 10A and 10B are made to face each other in a non-contact state.

In the optical connection structure 100, as illustrated in FIG. 6, assuming a case in which the distance between the flange portions 12 of both the ferrules 10A and 10B is L1, the distance from the flange portion 12 to the distal end portion 17 (distal end surface 17a) of each of the ferrules 10A and 10B is L2, and the distance between the distal end portions 17 is L3, a relationship of the distance L3=L1−L2×2 is established. Here, the distance L3 more strictly means a distance between the lens arrays 19 facing each other or, in a case where there is no lens, a distance between the distal end surfaces of the optical fibers 3 facing each other. The distance L2 from the flange portion 12 to the distal end portion 17 of each of the ferrules 10A and 10B is not particularly limited, but may be, for example, 2 mm or more and 10 mm or less in the case of a small ferrule. Furthermore, the distance L3 between the distal end portion 17 of the ferrule 10A and the distal end portion 17 of the ferrule 10B is not particularly limited, but may be, for example, 0.05 mm or more and 2.0 mm or less in the case of a small ferrule. In the optical connection structure 100, the ferrules 10A and 10B are not in contact with each other as described above, but the protrusion portions 17b of the respective ferrules 10A and 10B are also not in contact with each other. The protrusion portion 17b may not be provided. In this manner, in the optical connection structure 100, both the ferrules 10A and 10B are optically connected in a non-contact manner without lowering the optical coupling efficiency between the optical fibers 3 held in the respective ferrules 10A and 10B.

As described above, in the optical connection structure 100 according to the present embodiment, both ferrules 10A and 10B as connection objects have the side surface 13 provided with the recessed portion 15 and the side surface 14 provided with the recessed portion 16, and the adapter 20 has the inner surface provided with the protruding portion 24 fittable with the recessed portion 15 and the protruding portion 25 fittable with the recessed portion 16. Then, when both the ferrules 10A and 10B are inserted into the adapter 20, the recessed portions 15 are fitted with the protruding portion 24, and the recessed portions 16 are fitted with the protruding portion 25. Accordingly, the positions of both the ferrules 10A and 10B (that is, the positions of the plurality of optical fibers 3 held in each of both the ferrules 10A and 10B) with respect to the adapter 20 can be defined in a plane perpendicular to the Z direction. That is, according to this optical connection structure 100, by using the adapter 20 into which both the ferrules 10A and 10B are inserted and fitted as a positioning member when the plurality of optical fibers 3 are positioned, the plurality of optical fibers 3 can be positioned without providing a guide pin insertion hole in the ferrule 10. As a result, it is not necessary to use a guide pin having high dimensional accuracy for positioning the plurality of optical fibers 3 with each other. Furthermore, it is possible to avoid a situation in which the positioning accuracy between the plurality of optical fibers 3 decreases due to the use of the guide pin to which foreign matter adheres, so that a decrease in connection loss can be suppressed.

Moreover, in this optical connection structure 100, when the recessed portion 15 of each of the ferrules 10A and 10B is fitted with the protruding portion 24 of the adapter 20 and the recessed portion 16 is fitted with the protruding portion 25, the ferrules 10A and 10B are fittable into the adapter 20 such that the lens array 19 of the ferrule 10A and the lens array 19 of the ferrule 10B are optically connected each other while the distal end portion 17 of the ferrule 10A and the distal end portion 17 of the ferrule 10B face each other at the distance L3 separated from each other in the adapter 20. In this manner, since the optical connection structure 100 has a non-contact structure between the distal end portions 17 of both the ferrules 10A and 10B, even in a case where foreign matter or the like adheres to the distal end portion of any of the ferrules, it is possible to reduce the influence on the distance between both the ferrules 10A and 10B, the inclination of each of the ferrules 10A and 10B, and the like. Furthermore, since the optical connection structure 100 has a non-contact structure between the distal end portions 17 of both the ferrules 10A and 10B, it is possible to prevent foreign matter adhering to the distal end portion 17 from being fixed by pressing or the like, and thus, it is possible to easily remove the foreign matter from the distal end portion 17 by air or the like. Moreover, according to this optical connection structure 100, a conventional fitting method using a guide pin is unnecessary, so that an expensive guide pin is unnecessary. Accordingly, it is possible to reduce the cost while maintaining the optical connection between the optical fibers 3 held in the respective ferrules 10A and 10B with high accuracy.

Furthermore, in the present embodiment, the lens array 19 is provided at the distal end portion 17 as the light incidence/ emission unit of each of the ferrules 10A and 10B. Therefore, the light emitted from each of the ferrules 10A and 10B can be easily made into collimated light, and the optical coupling efficiency between the optical fibers 3 held by both the ferrules 10A and 10B can be enhanced. The lens array 19 may not convert the light incident from the optical fibers 3 into collimated light in a strict sense as long as the coupling efficiency is within an allowable range.

Figure 7:
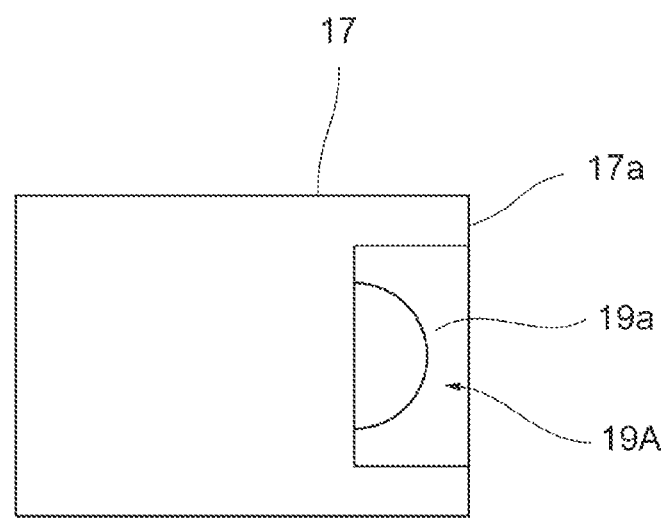
FIG. 7 is a schematic cross-sectional view illustrating an example of a light incidence/emission unit.
Figure 8:
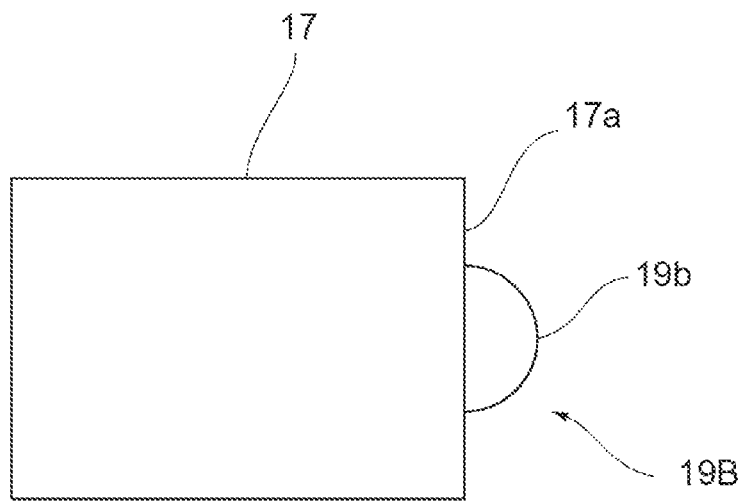
FIG. 8 is a schematic cross-sectional view illustrating another example of the light incidence/emission unit.

Furthermore, in the present embodiment, the lens array 19 is provided in a region recessed from the distal end surface 17a of the distal end portion 17 to the inside of the ferrule, and the distal end of the lens array 19 is located inside the ferrule with respect to the distal end surface 17a. As a result, adhesion of foreign matter or the like to a lens surface of the lens array 19 can be reduced. As a lens array with such a mode, for example, a lens array 19A illustrated in FIG. 7 can also be used. In the lens array 19A illustrated in FIG. 7, there is also a canopy above the lens portion, and the lens array 19A is more reliably arranged inside. In this case, adhesion of foreign matter or the like to a lens surface 19a of the lens array 19A can be further reduced. Furthermore, conversely, in the ferrules 10A and 10B, as illustrated in FIG. 8, a lens array 19B having a shape protruding from the distal end surface 17a of the distal end portion 17 to the outside of the ferrule may be provided as the light incidence/emission unit. In this case, the lens array 19B protrudes from the distal end surface 17a, and not only the distal end but also the proximal end side of a lens surface 19b is formed to protrude to the surface. Accordingly, adhesion of foreign matter or the like to the lens array 19B can be easily removed by a connector cleaner or the like. In the optical connection structure 100 according to the present embodiment, the ferrules 10A and 10B are arranged to face each other in a non-contact state. Accordingly, even with the lens array 19B having such a protruding mode, it is possible to sufficiently secure an optically required distance between lenses.

Furthermore, in the present embodiment, the protruding portions 24 and 25 (in particular, the protruding portion 24) of the adapter 20 are configured to be elastically deformable in the Y direction. According to this aspect, the ferrules 10A and 10B are easily inserted into the adapter 20, so that workability when the ferrules 10A and 10B are inserted into the adapter 20 is improved. Furthermore, when the ferrules 10A and 10B are inserted into the adapter 20, in a case where the recessed portions 15 and 16 respectively abut on the protruding portions 24 and 25, a force of the protruding portion 24 or the like trying to return to the original position is applied to the ferrules 10A and 10B. As a result, the ferrules 10A and 10B are more reliably sandwiched and fixed by the protruding portion 24 and the protruding portion 25, so that the positional displacement of the ferrules 10A and 10B with respect to the adapter 20 is suppressed. As a result, the plurality of optical fibers 3 held in each of the ferrules 10A and 10B can be positioned with high accuracy.

The optical connection structure according to the present disclosure has been described heretofore, but the present disclosure is not limited to the embodiment described above, and can be appropriately modified without departing from the gist described in the claims.

Figure 9:
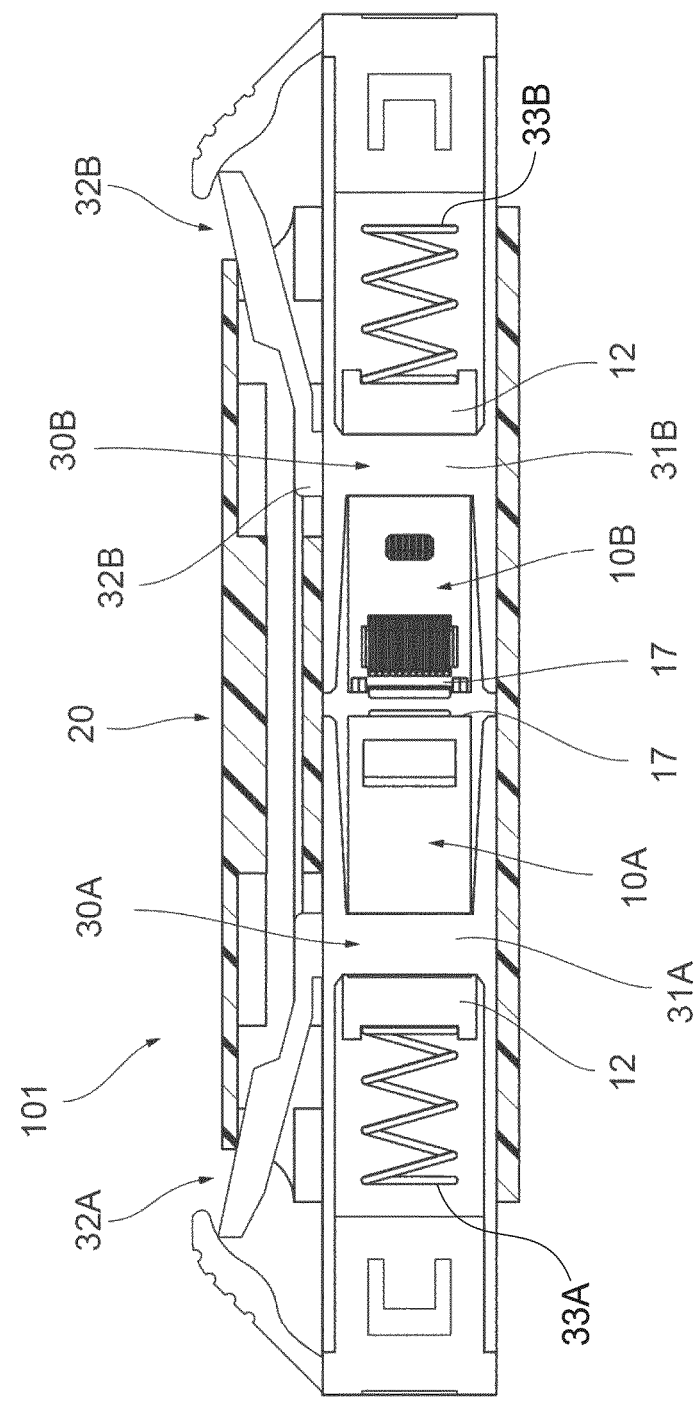
FIG. 9 is a perspective view illustrating an optical connection state in which the pair of optical connectors (ferrules) are optically connected in the adapter via a housing.

For example, as illustrated in FIG. 9, the facing and separated arrangement described above may be applied to an optical connection structure 101 provided with housings 30A and 30B that hold the ferrules 10A and 10B described above. In this case, the respective flange portions 12 biased toward the distal end portions by first and second springs 33A and 33B are respectively made to abut on column portions 31A and 31B of the housings 30A and 30B. Accordingly, movement of the respective ferrules 10A and 10B toward the distal end portion side along the Z-axis direction is restricted. The flange portions 12 and the column portions 31A and 31B function as a part of a positioning structure. Then, latches 32A and 32B of the respective housings 30A and 30B are made to abut on the inner surface of the adapter 20. Accordingly, the movement of the respective housings 30A and 30B toward the distal end portion side along the Z direction is restricted. The latches 32A and 32B and the contact portions of the adapter 20 function as another part of a positioning structure. According to such a configuration including the housings, the ferrules 10A and 10B are also indirectly positioned with respect to the adapter 20, so that optical connection can be performed in a state in which the ferrules 10A and 10B are arranged to be separated from each other. Note that, in the modification illustrated in FIG. 9, with the above configuration, the ferrules 10A and 10B can be positioned even if each flange portion 12 of the ferrules 10A and 10B is not in contact with the adapter 20. However, the ferrules 10A and 10B are inserted into the adapter 20 such that each of the side surfaces 13 and 14 comes into contact with the protruding portion inside the adapter 20.

Figure 10:
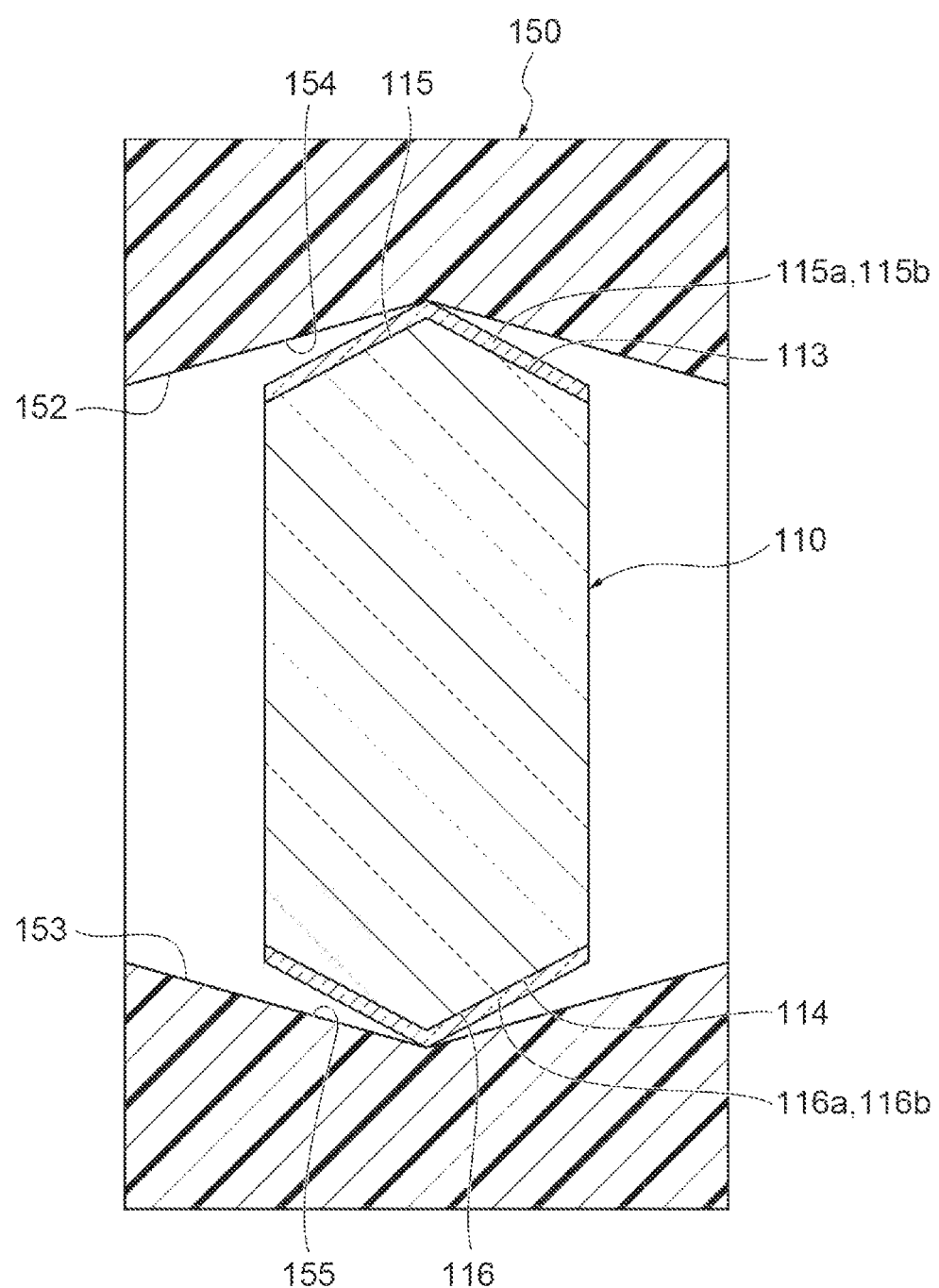
FIG. 10 is a cross-sectional view of an optical connection structure according to a modification.
Figure 11:
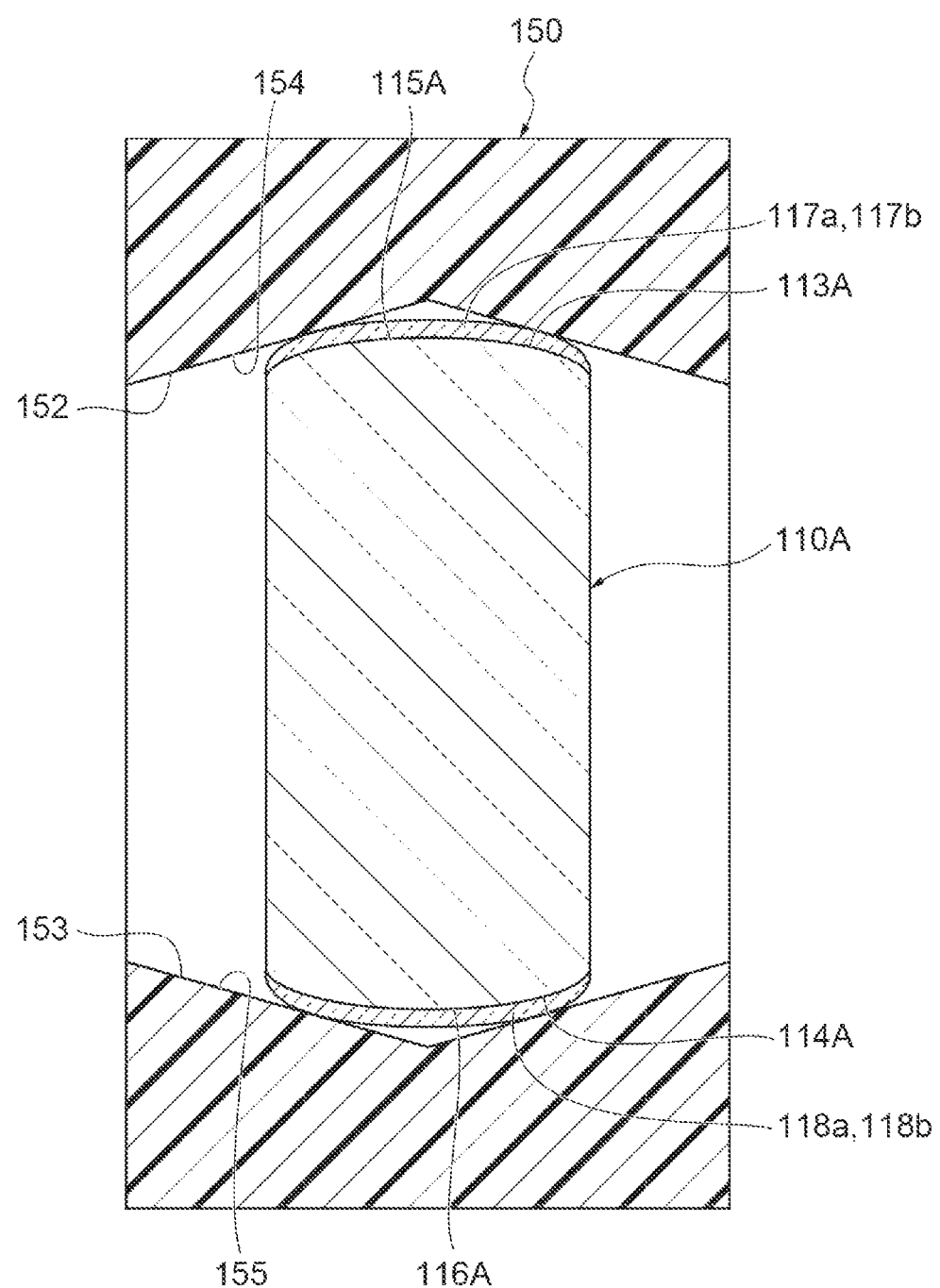
FIG. 11 is a cross-sectional view of an optical connection structure according to another modification.

Furthermore, in the above embodiment, the recessed portions 15 and 16 (grooves) are formed in the side surfaces 13 and 14 of the ferrule 10, the protruding portions 24 and 25 are formed on the inner surface of the adapter 20, and the protruding portions 24 and 25 enter the recessed portions 15 and 16, so that the ferrule 10 is positioned with respect to the adapter 20. Conversely, however, as illustrated in FIG. 10, protruding portions 115 and 116 (a first protruding portion and a second protruding portion) may be formed on side surfaces 113 and 114 of a ferrule 110, recessed portions 154 and 155 (a third recessed portion and a fourth recessed portion) may be provided in side surfaces 152 and 153 of an adapter 150, and each ferrule 110 may be inserted into the adapter 150. A basic configuration of each ferrule 110 excluding the shapes of the side surfaces is similar to the ferrule 10. In a case of this modification, two positioning portions 115a and 115b may be provided on the protruding portion 115 formed on the side surface 113 of the ferrule 110, and two positioning portions 116a and 116b may be provided on the protruding portion 116 formed on the side surface 114 of the ferrule 110. The two positioning portions 115a and 115b and the two positioning portions 116a and 116b are, similarly to the positioning portions 15a and 15b and the positioning portions 16a and 16b of the ferrule 10, formed to be separated from each other in the longitudinal direction (Z direction, a direction orthogonal to the paper surface of FIG. 10), and formed to protrude slightly outward with respect to other portions (stepped portions) of the side surface 113 and the side surface 114. Furthermore, as illustrated in FIG. 11, protruding portions 115A and 116A of side surfaces 113A and 114A of each ferrule 110A may have a semicircular protrusion shape or an elliptical protrusion shape, and two positioning portions 117a and 117b and two positioning portions 118a and 118b may be respectively provided on the side surfaces 113A and 114A having such a shape. Similarly to the above, the two positioning portions 117a and 117b and the two positioning portions 118a and 118b are, similarly to the positioning portions 15a and 15b and the positioning portions 16a and 16b of the ferrule 10, formed to be separated from each other in the longitudinal direction (Z direction), and formed to protrude slightly outward with respect to other portions (stepped portions) of the side surface 113A and the side surface 114A. Note that a basic configuration of the ferrules 110 and 110A excluding the shapes of the side surfaces is similar to the ferrule 10, and a detailed description thereof is omitted in FIGS. 10 and 11.

Furthermore, in the above embodiment, the adapter 20 is made of, for example, an elastic material, but may be made of a material that is not elastically deformed (or a material that is not substantially elastically deformed). In this case, the distance between the bottom portions of the recessed portions 15 and 16 of the ferrules 10A and 10B may be the same as or slightly narrower than the distance between the distal ends of the protruding portions 24 and 25 of the adapter 20. With such a configuration, even in a case where the adapter 20 does not elastically deform, the positions of both the ferrules 10A and 10B (that is, the positions of the plurality of optical fibers 3 held in each of both the ferrules 10A and 10B) with respect to the adapter 20 can be appropriately defined in a plane perpendicular to the Z direction.

REFERENCE SIGNS LIST

1 Optical connector
3 Optical fiber
4 Optical fiber ribbon
6 Lid portion
10, 10A, 10B, 110, 110A Ferrule
11 Main body portion
11a, 11b Window portion
11c Optical fiber groove
12 Flange portion
13, 113, 113A Side surface (first side surface)
14, 114, 114A Side surface (second side surface)
15 Recessed portion (first recessed portion)
15a, 15b, 115a, 115b, 117a, 117b Positioning portion
15c, 15d, 15e Stepped portion
16 Recessed portion (second recessed portion)
16a, 16b, 116a, 116b, 118a, 118b Positioning portion
16c, 16d, 16e Stepped portion
17 Distal end portion
17a Distal end surface
17b Protrusion portion
18 Rear end portion
19, 19A, 19B Lens array (first light incidence/emission unit, second light incidence/emission unit)
19a, 19b Lens surface
20, 150 Adapter
21 First opening
22 Second opening
23 Accommodation portion
23a, 23b, 23c, 23d, 152, 153 Side surface
24 Protruding portion (third protruding portion)
24a Support portion
25 Protruding portion (fourth protruding portion)
26 Void
30A, 30B Housing
31A, 31B Column portion
32A, 32B Latch
100, 101 Optical connection structure
115, 115A Protruding portion (first protruding portion)
116, 116A Protruding portion (second protruding portion)
154 Recessed portion (third recessed portion)
155 Recessed portion (fourth recessed portion)

The invention claimed is:

1. An optical connection structure comprising:
a first ferrule;
a second ferrule; and
an adapter capable of accommodating the first ferrule and the second ferrule therein,
wherein the first ferrule includes a distal end portion located at a distal end in a first direction that is a direction in which the first ferrule is inserted into or removed from the adapter and where a first light incidence/emission unit is formed, and a first side surface and a second side surface facing each other in a second direction intersecting the first direction,
wherein the second ferrule includes a distal end portion located at a distal end in the first direction and where a second light incidence/emission unit is formed, and a first side surface and a second side surface facing each other in the second direction,
wherein each of the first side surface of the first ferrule and the first side surface of the second ferrule is provided with a first recessed portion or a first protruding portion extending along the first direction, and each of the second side surface of the first ferrule and the second side surface of the second ferrule is provided with a second recessed portion or a second protruding portion extending along the first direction,
wherein the adapter has an inner surface provided with a third protruding portion fittable with both the first recessed portions of the first ferrule and the second ferrule or a third recessed portion fittable with both the first protruding portions of the first ferrule and the second ferrule, and a fourth protruding portion fittable with both the second recessed portions of the first ferrule and the second ferrule or a fourth recessed portion fittable with both the second protruding portions of the first ferrule and the second ferrule, and
wherein, when both the first recessed portions or both the first protruding portions of the first ferrule and the second ferrule are fitted with the third protruding portion or the third recessed portion of the adapter and both the second recessed portions or both the second protruding portions of the first ferrule and the second ferrule are fitted with the fourth protruding portion or the fourth recessed portion of the adapter, the first ferrule and the second ferrule are fittable into the adapter such that the first light incidence/emission unit and the second light incidence/emission unit are optically connected to each other while a distal end surface of the distal end portion of the first ferrule and a distal end surface of the distal end portion of the second ferrule face each other at a predetermined distance separated from each other in the adapter.

2. The optical connection structure according to claim 1, wherein, when the first light incidence/emission unit and the second light incidence/emission unit are optically connected, the predetermined distance between the distal end portion of the first ferrule and the distal end portion of the second ferrule facing each other and separated from each other is 0.05 mm or more and 2.0 mm or less.

3. The optical connection structure according to claim 1, wherein at least a part of the first ferrule, the second ferrule, and the adapter is provided with a positioning structure to position the distal end portion of the first ferrule and the distal end portion of the second ferrule so as to face each other at the predetermined distance separated from each other.

4. The optical connection structure according to claim 3, wherein the first ferrule further includes a flange portion provided on a side opposite to the distal end portion in the first direction and having a width in the second direction larger than a width of the distal end portion, and
wherein the flange portion functions as a part of the positioning structure to directly or indirectly position the first ferrule with respect to the adapter.

5. The optical connection structure according to claim 4, wherein a distance from an end of the flange portion of the first ferrule on a side of the distal end portion to the distal end portion is 2 mm or more and 10 mm or less.

6. The optical connection structure according to claim 4, further comprising
a housing that accommodates the first ferrule, wherein the housing is configured such that movement of the housing along the first direction with respect to the adapter is restricted, and movement of the first ferrule along the first direction with respect to the housing is restricted by the flange portion, whereby positioning of the first ferrule with respect to the adapter is executed.

7. The optical connection structure according to claim 1, wherein at least one light incidence/emission unit of the first light incidence/emission unit and the second light incidence/emission unit is a lens array arranged along the second direction.

8. The optical connection structure according to claim 7, wherein the lens array is provided in a region recessed from the distal end surface of the distal end portion to an inside of at least one of the first ferrule and the second ferrule, and a distal end of the lens array is located inside the at least one of the first ferrule and the second ferrule with respect to the distal end surface.

9. The optical connection structure according to claim 7, wherein the lens array has a shape protruding from the distal end surface of the distal end portion to an outside of at least one of the first ferrule and the second ferrule.

10. The optical connection structure according to claim 1, wherein at least one of the third protruding portion or the third recessed portion and the fourth protruding portion or the fourth recessed portion of the adapter is configured to be elastically deformable in the second direction.

11. The optical connection structure according to claim 1, wherein each of the first side surface of the first ferrule and the first side surface of the second ferrule is provided with the first recessed portion extending along the first direction, and each of the second side surface of the first ferrule and the second side surface of the second ferrule is provided with the second recessed portion extending along the first direction,
wherein the inner surface of the adapter is provided with the third protruding portion fittable with both the first recessed portions of the first ferrule and the second ferrule, and the fourth protruding portion fittable with both the second recessed portions of the first ferrule and the second ferrule, and
wherein, when both the first recessed portions of the first ferrule and the second ferrule are fitted with the third protruding portion of the adapter and both the second recessed portions of the first ferrule and the second ferrule are fitted with the fourth protruding portion of the adapter, the first ferrule and the second ferrule are fittable into the adapter such that the first light incidence/emission unit and the second light incidence/emission unit are optically connected to each other while the distal end portion of the first ferrule and the distal end portion of the second ferrule face each other at a predetermined distance separated from each other in the adapter.

12. The optical connection structure according to claim 1, further comprising
a first spring configured to bias a flange portion of the first ferrule toward the second ferrule; and
a second spring configured to bias a flange portion of the second ferrule toward the first ferrule.

13. The optical connection structure according to claim 1, wherein the first side surface of the first ferrule includes a first positioning portion and a second positioning portion, and a first stepped portion located between the first positioning portion and the second positioning portion, the first positioning portion and the second positioning portion being configured to contact the third protruding portion or the third recessed portion, while the first stepped portion is configured not to contact the third protruding portion or the third recessed portion, and
wherein the second side surface of the first ferrule includes a third positioning portion and a fourth positioning portion, and a second stepped portion located between the third positioning portion and the fourth positioning portion, the third positioning portion and the fourth positioning portion being configured to contact the fourth protruding portion or the fourth recessed portion, while the second stepped portion is configured not to contact the fourth protruding portion or the fourth recessed portion.

14. The optical connection structure according to claim 13,
wherein the first positioning portion and the second positioning portion are separated from each other in the first direction in a range of 3 mm to 10 mm.

15. An optical connection structure comprising:
a first ferrule;
a second ferrule; and
an adapter capable of accommodating the first ferrule and the second ferrule therein,
wherein the first ferrule includes a distal end portion located at a distal end in a first direction that is a direction in which the first ferrule is inserted into or removed from the adapter and where a first light incidence/emission unit is formed, and a first side surface and a second side surface facing each other in a second direction intersecting the first direction, wherein the second ferrule includes a distal end portion located at a distal end in the first direction and where a second light incidence/emission unit is formed, and a first side surface and a second side surface facing each other in the second direction, wherein each of the first side surface of the first ferrule and the first side surface of the second ferrule is provided with a first recessed portion or a first protruding portion extending along the first direction, and each of the second side surface of the first ferrule and the second side surface of the second ferrule is provided with a second recessed portion or a second protruding portion extending along the first direction, wherein the adapter has an inner surface provided with a third protruding portion fittable with both the first recessed portions of the first ferrule and the second ferrule or a third recessed portion fittable with both the first protruding portions of the first ferrule and the second ferrule, and a fourth protruding portion fittable with both the second recessed portions of the first ferrule and the second ferrule or a fourth recessed portion fittable with both the second protruding portions of the first ferrule and the second ferrule, wherein, when both the first recessed portions or both the first protruding portions of the first ferrule and the second ferrule are fitted with the third protruding portion or the third recessed portion of the adapter and both the second recessed portions or both the second protruding portions of the first ferrule and the second ferrule are fitted with the fourth protruding portion or the fourth recessed portion of the adapter, the first ferrule and the second ferrule are fittable into the adapter such that the first light incidence/emission unit and the second light incidence/emission unit are optically connected to each other while the distal end portion of the first ferrule and the distal end portion of the second ferrule face each other at a predetermined distance separated from each other in the adapter, wherein at least a part of the first ferrule, the second ferrule, and the adapter is provided with a positioning structure to position the distal end portion of the first ferrule and the distal end portion of the second ferrule so as to face each other at the predetermined distance separated from each other, wherein the first ferrule further includes a flange portion provided on a side opposite to the distal end portion in the first direction and having a width in the second direction larger than a width of the distal end portion, and wherein the flange portion functions as a part of the positioning structure to directly or indirectly position the first ferrule with respect to the adapter.

16. An optical connection structure comprising:
a first ferrule;
a second ferrule; and
an adapter capable of accommodating the first ferrule and the second ferrule therein, wherein the first ferrule includes a distal end portion located at a distal end in a first direction that is a direction in which the first ferrule is inserted into or removed from the adapter and where a first light incidence/emission unit is formed, and a first side surface and a second side surface facing each other in a second direction intersecting the first direction, wherein the second ferrule includes a distal end portion located at a distal end in the first direction and where a second light incidence/emission unit is formed, and a first side surface and a second side surface facing each other in the second direction, wherein each of the first side surface of the first ferrule and the first side surface of the second ferrule is provided with a first recessed portion or a first protruding portion extending along the first direction, and each of the second side surface of the first ferrule and the second side surface of the second ferrule is provided with a second recessed portion or a second protruding portion extending along the first direction, wherein the adapter has an inner surface provided with a third protruding portion fittable with both the first recessed portions of the first ferrule and the second ferrule or a third recessed portion fittable with both the first protruding portions of the first ferrule and the second ferrule, and a fourth protruding portion fittable with both the second recessed portions of the first ferrule and the second ferrule or a fourth recessed portion fittable with both the second protruding portions of the first ferrule and the second ferrule, wherein, when both the first recessed portions or both the first protruding portions of the first ferrule and the second ferrule are fitted with the third protruding portion or the third recessed portion of the adapter and both the second recessed portions or both the second protruding portions of the first ferrule and the second ferrule are fitted with the fourth protruding portion or the fourth recessed portion of the adapter, the first ferrule and the second ferrule are fittable into the adapter such that the first light incidence/emission unit and the second light incidence/emission unit are optically connected to each other while the distal end portion of the first ferrule and the distal end portion of the second ferrule face each other at a predetermined distance separated from each other in the adapter, wherein at least one light incidence/emission unit of the first light incidence/emission unit and the second light incidence/emission unit is a lens array arranged along the second direction, and wherein the lens array has a shape protruding from the distal end surface of the distal end portion to an outside of at least one of the first ferrule and the second ferrule.

* * * * *